United States Patent [19]
Yoshida

[11] Patent Number: 5,369,999
[45] Date of Patent: Dec. 6, 1994

[54] NON-FULL STATE DETECTING APPARATUS AND METHOD

[75] Inventor: Yutaka Yoshida, Aichi, Japan

[73] Assignee: Aichi Tokei Denki Co., Ltd., Aichi, Japan

[21] Appl. No.: 25,678

[22] Filed: Mar. 3, 1993

[30] Foreign Application Priority Data

Mar. 4, 1992 [JP] Japan .................................. 4-045873

[51] Int. Cl.$^5$ .................................................. G01F 1/58
[52] U.S. Cl. ............................. 73;861.12; 73/861.16
[58] Field of Search ............ 73/861.12, 861.16, 861.17, 73/861.08, DIG. 5

[56] References Cited

U.S. PATENT DOCUMENTS

| 3,757,576 | 9/1973 | Rolff et al. | 73/861.17 |
| 3,991,612 | 11/1976 | Mannherz et al. | 73/861.17 |
| 4,036,052 | 7/1977 | Searle | 73/861.17 |
| 4,663,976 | 5/1987 | Suzuki et al. | 73/861.12 |
| 4,773,274 | 9/1988 | Kobayashi et al. | 73/861.16 |
| 5,271,280 | 12/1993 | Nissen | 73/861.16 |
| 5,299,461 | 4/1994 | Schafer et al. | 73/861.16 |
| 5,307,688 | 5/1994 | Lefebure | 73/861.12 X |

FOREIGN PATENT DOCUMENTS 2063792 12/1970 Germany .
59-230115 12/1984 Japan .

OTHER PUBLICATIONS

Patent Abstracts of Japan vol. 9, No. 109 (P-355) 14 May 1985 & JP-A-59 230 115 (Yamatake Honeywell) *abstract*.

Primary Examiner—Richard E. Chilcot, Jr.
Assistant Examiner—Elizabeth L. Dougherty
Attorney, Agent, or Firm—Pollock, Vande Sande & Priddy

[57] ABSTRACT

A non-full state detecting apparatus comprises an upper excitation coil disposed above the conduit, a lower excitation coil disposed below the conduit, a sensor provided on the side of the conduit for producing an output corresponding to the fluid when each of the coils is excited, a device for exciting both the upper and lower coils, a device for exciting any one of the upper and lower coils, a comparator for comparing a first output from the sensor produced when both the coils are excited and a second output from the sensor produced when any one of the coils is excited, and a device for determining from the result of the comparison by the comparator whether the conduit is full of the flow flowing therethrough. The excitation of both the upper and lower coils renders uniform a magnetic flux distribution in the conduit to thereby achieve detection without an error.

8 Claims, 5 Drawing Sheets

NON-FULL STATE DETECTING APPARATUS AND METHOD

BACKGROUND OF THE INVENTION

The present invention relates to a non-full state detecting apparatus and methods and more particularly to improvements to an apparatus and method for detecting whether a test conduit is full of a fluid flowing therethrough or not.

As shown in FIG. 1, JP-A-59-2301158 discloses a conventional electromagnetic flowmeter which is provided with excitation coils 2, 3 disposed respectively above and below a test conduit 1, a power source 6 and a changeover switch 7 which selectively drive those coils. When a ratio $V_U/V_L$ is equal to, or less than, a given value where $V_U$ is an output from a pair of horizontally opposing electrodes 4, 5 disposed on the inner surface of the test conduit 1 under the condition where the excitation coil 2 disposed above the conduit 1 is driven, and $V_L$ is an output from the pair of electrodes 4, 5 under the condition where the excitation coil 3 disposed below the conduit 1 is driven, an operation control unit 11 determines that the conduit 1 is in a non-full state where the conduit is not full of a fluid and supplies a predetermined output, for example, to an alarm (not shown) to drive same and alert the user to that state.

Each time the changeover switch 7 is switched with a timing pulse generated by a pulse generator 8, the upper and lower excitation coils 2 and 3 are selectively driven. Even when any one of the coils is driven, an electromotive force is generated across the opposing electrodes 4 and 5.

The electromotive force, or the sensor output, is amplified by an amplifier 9, the output of which is converted by an A/D converter 10 to a digital one, which is then delivered to the operation control unit 11 which includes a CPU. The operation control unit 11 calculates a flow in a pre-stored program and sends data on the calculated flow, for example, to a controller, (not shown) which needs the data, through a D/A converter (not shown), if necessary.

The operation control unit 11 also provides control over the pulse generator 8 and invariably monitors the outputs obtained across the electrodes 4 and 5 when the respective upper and lower excitation coils 2 and 3 are selected and driven.

Generally, the generated electromotive force from the electromagnetic flowmeter sensor is not proportional to the average flow velocity when the flow velocity distribution is vertically asymmetrical.

Thus, when in FIG. 1 a non-full fluid 12 flows through the conduit 1 with an air layer 13 being produced above the fluid within the conduit 1, the flow velocity distribution becomes asymmetrical vertically with a lower larger distribution.

The magnetic field strength distribution obtained when the upper excitation coil 2 is driven is not the same as that obtained when the lower coil 3 is driven. The distribution is heavy in its upper portion when the upper coil 2 is exited and the distribution is heavy in this lower coil 3 is exited (see Fig.2).

If conduit 1 is in a full state where the conduit is full of a fluid, both the sensor outputs are the same in any of these two cases. If the conduit is in a non-full state, the degrees of contribution of the magnetic strength of the upper and lower coils to the output are not equal and the ratio of the output $V_U$ obtained when the upper coil is driven to the output $V_L$ obtained when the lower coil is driven is less than 1 ($V_U/V_L < 1$).

Thus, the outputs obtained when both the coils are driven are invariably monitored, and the user is alerted to that fact when the ratio of those outputs becomes a given value or less.

The electromagnetic flowmeter normally operates in a state full, so that when such an alarm is generated, or when the conduit is in a non-full state, the operator takes proper steps such as stoppage of the flow measurement.

The principles of the electromagnetic flowmeter are as follows. The relationship between the flow and the output of a sensor obtained when the upper coil for the test conduit is excited is beforehand obtained. The flow is calculated from the obtained sensor output on the basis of the above relationship. (Concerning the details of such principles, see U.S. Ser. No. 07/968508, filed on Oct. 29, 1992 whose assignee is the same as in this application). This earlier application also discloses an electromagnetic flowmeter which operates also in a non-full state. This earlier application is incorporated herein by reference.

In the non-full state flowmeter of FIG. 1, the magnetic flux distribution in the conduit produced when each of the upper and lower coils 2 and 3 is excited is vertically asymmetrical, as shown in FIG. 2, so that detection may involve errors.

The above conventional technique has the problem that responsiveness and the stability of the zero point are low, which will be described below.

(a) Low responsiveness

When the upper and lower excitation coils 2 and 3 are alternately driven at periods of excitation t and the flow is to be calculated on the basis of outputs $V_U$ and $V_L$ deriving when the corresponding coils are excited, as shown in FIG. 3, a time 2t which is twice the period of excitation t as shown in FIG. 3 is required for the measurement of the flow. This is equivalent to a change of the period of excitation to 2t, which implies a deterioration in the responsiveness to a change in the flow.

(b) Low stability of the zero-point

In order to solve the problem of the responsiveness in the (a), the period of excitation t is required to be reduced to t/2. It is well known that the stability of the zero point of the electromagnetic flowmeter is deteriorated as the period of excitation is reduced.

This is because the cause of unstableness of the zero point derives from simultaneous sampling of the flow signal and 90°-noise which is superposed on the flow signal and attenuated exponentially. If the period of excitation is long, the flow signal can be sampled when the 90°-noise is low, as shown in FIG. 4(II), while if the period of excitation is shorter, a relatively large 90°-noise portion is inevitably sampled, as shown in FIG. 4(I).

As just described above, the conventional technique cannot avoid either one of the above problems (a) and (b).

SUMMARY OF THE INVENTION

It is an object of the present invention to solve at least one of the above problems.

It is another object of the present invention to provide a non-full state detecting apparatus and method and apparatus having a new structure.

It is a further object of the present invention to provide a non-full state detecting apparatus and method involving a reduced small detection error.

It is a still further object of the present invention to provide a non-full state detecting apparatus and method which provides high responsiveness.

In order to achieve at least one of the above objects, according to the present invention, the output (first output) of a sensor obtained when both an upper and a lower coil are excited and the output (second output) of the sensor obtained when either the upper or lower coil is excited are compared.

The detecting apparatus according to the present invention may share its components with the electromagnetic flowmeter. Thus, in the measurement of the flow, both the upper and lower coils are excited and the flow of the fluid is estimated from a sensor output in accordance with the beforehand prepared relationship between output and flow. The excitation of both, the upper and lower coils, brings about a vertically and horizontally symmetrical distribution of magnetic field strength in the conduit. When a non-full state detection is desired to be performed in the measurement of the flow, the ratio of an output from the opposing electrodes, or a sensor, on the basis of the magnetic field from one of the coils under the condition where excitation of the other of the coils is stopped to an output from the opposing electrodes when both coils are excited is calculated. When the ratio changes by more than a constant value compared to that deriving when the conduit is full of the fluid, it is determined that the conduit is not full of the fluid.

Alternatively, when a non-full state detection is desired to be performed, the ratio of an output from the opposing electrodes on the basis of the magnetic field of the upper coil under the condition where excitation of the lower coil is stopped to an output from the opposing electrodes under the condition where both the upper and lower coils are excited is calculated. When the ratio is lower than a constant value, it may be determined that the conduit is not full of the fluid.

Alternatively, when a non-full state detection is desired to be performed, the ratio of an output from the opposing electrodes on the basis of the magnetic field of the lower coil under condition where excitation of the upper coil is stopped to an output from the opposing electrodes under the condition where both the upper and lower coils are excited is calculated. When the ratio exceeds a constant value, it may be determined that the conduit is not full of the fluid.

Since in any case both the upper and lower coils are excited, the interval in which the magnetic strength in the conduit is asymmetrical is reduced. Thus, the error involved is reduced compared to the conventional non-full state detecting apparatus.

The non-full state can be detected by simply stopping the excitation of one of the upper and lower coils excited in the normal operational state. Therefore, responsiveness is improved. Thus, the excitation period can be increased and hence the stability of the zero point is ensured.

BRIEF DESCRIPTION OF THE DRAWINGS

These and other objects and technical advantages of the present invention will be readily apparent from the following description of the preferred exemplary embodiments of the present invention in conjunction with the accompanying drawings, in which.

DESCRIPTION OF THE PREFERRED EMBODIMENT

Figure 1:
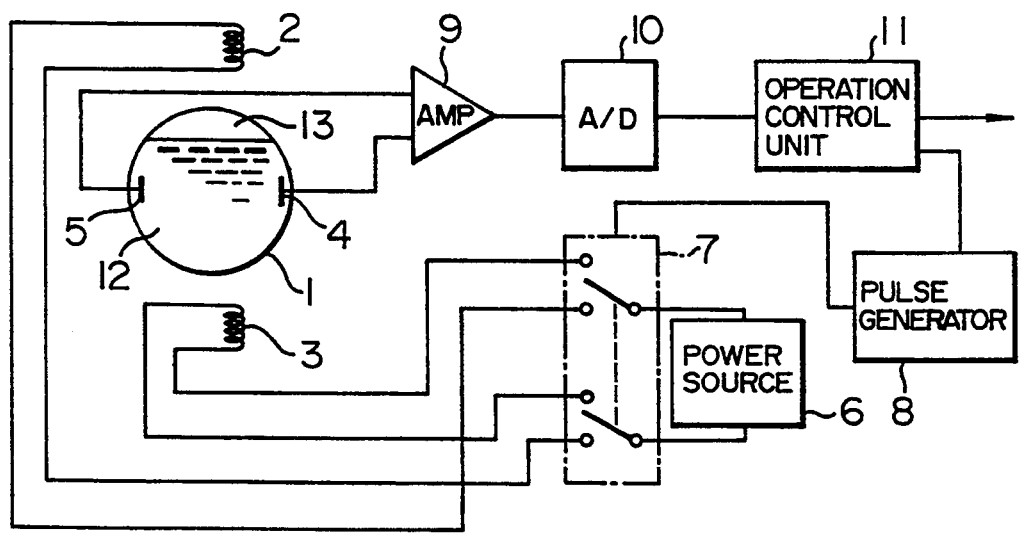
FIG. 1 is a block diagram of a conventional non-full state detection apparatus.
Figure 2A:
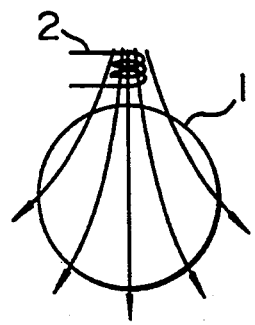
FIGS. 2A and 2B show a magnetic flux distribution across a conduit in the conventional apparatus.
Figure 2B:
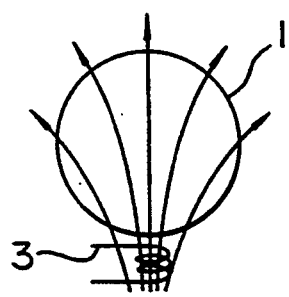
Figure 3:
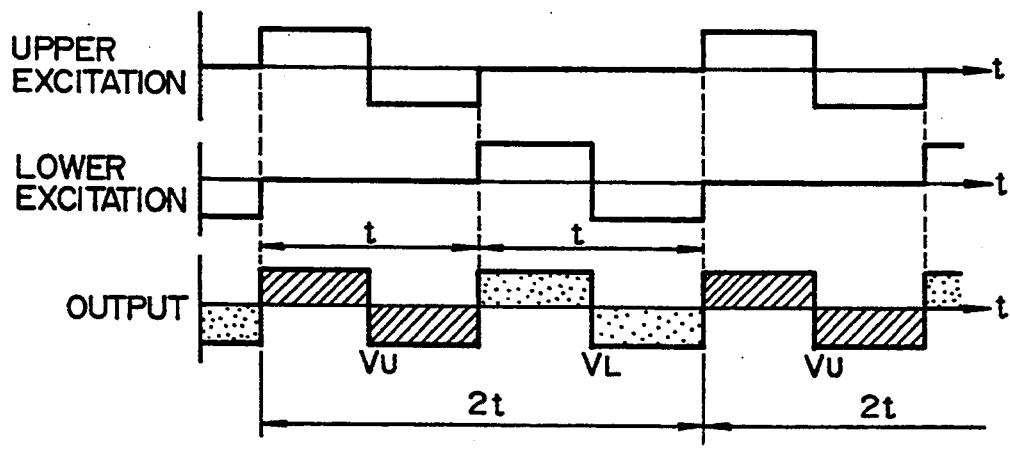
FIG. 3 shows an excitation waveform and an output waveform in the conventional apparatus.

In an embodiment of FIG. 5, reference numeral 1 denotes a test conduit; numerals 2, 3, excitation coils disposed respectively above and below the test conduit; numerals 4,5, designate opposing electrodes disposed horizontally inside the testing conduit 1; 9 is an amplifier which amplifies an electromotive force generated across the opposing electrodes 4 and 5 or a sensor output. The sensor output amplified by the amplifier 9 is converted by an A/D converter 10 to a digital signal, which is then delivered to an operational unit 14.

Reference numerals 15, 16 denote an upper coil power source and a lower coil power source which excite the upper and lower excitation coils, respectively. One power source, for example the lower coil power source 16, can stop current feed in response to a signal from a timing circuit 17 while the other or upper coil power source 15 is put in a continuous excitation state.

Reference numeral 12 denotes a fluid which flows through the test conduit 1; and 13, an air layer produced above the fluid in a non-full state.

Figure 6:
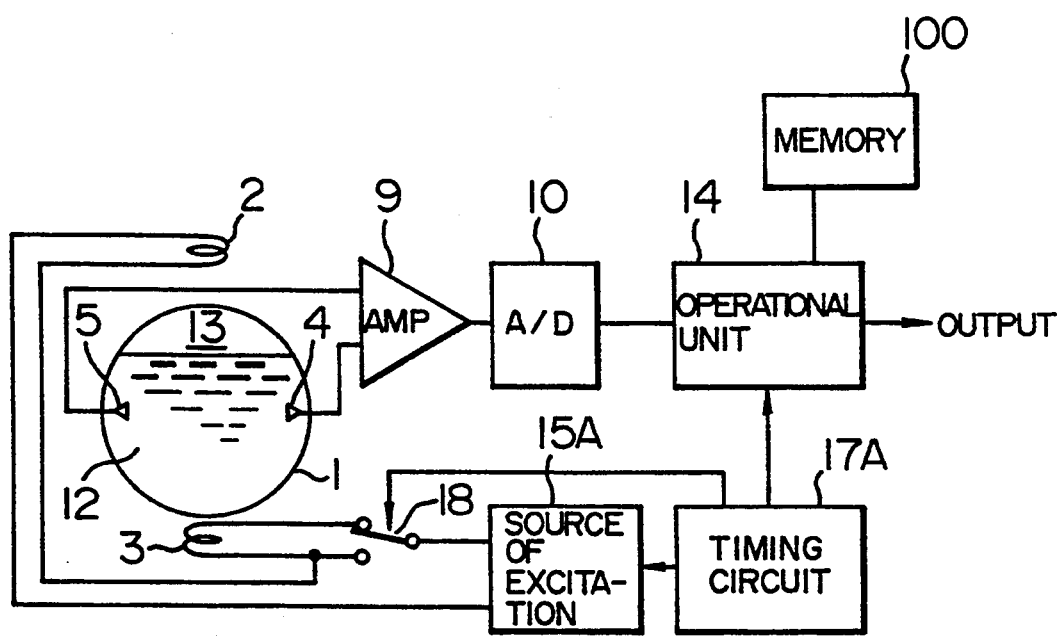
FIG. 6 is a block diagram of a second embodiment of the present invention.

A second embodiment of FIG. 6 is partially different in structure from the first embodiment. Normally, only a single exciting power source 15A is used. When required, a changeover switch 18 which can shunt the supply of an excitation current, for example, to the lower excitation coil 3 is switched by a timing circuit 18A from the shown position to another position to stop the excitation of the lower coil 3 temporarily.

Figure 7:
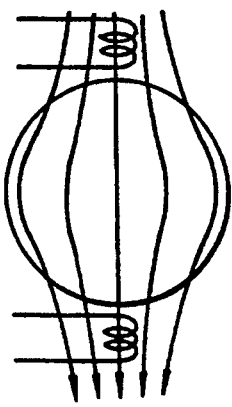
FIG. 7 shows a magnetic flux distribution across a conduit in the embodiment of the present invention.

The magnetic flux distribution obtained when the upper and lower coils 2 and 3 are excited in the present embodiment is even and vertically and horizontally symmetrical as shown in FIG. 7.

Figure 5:
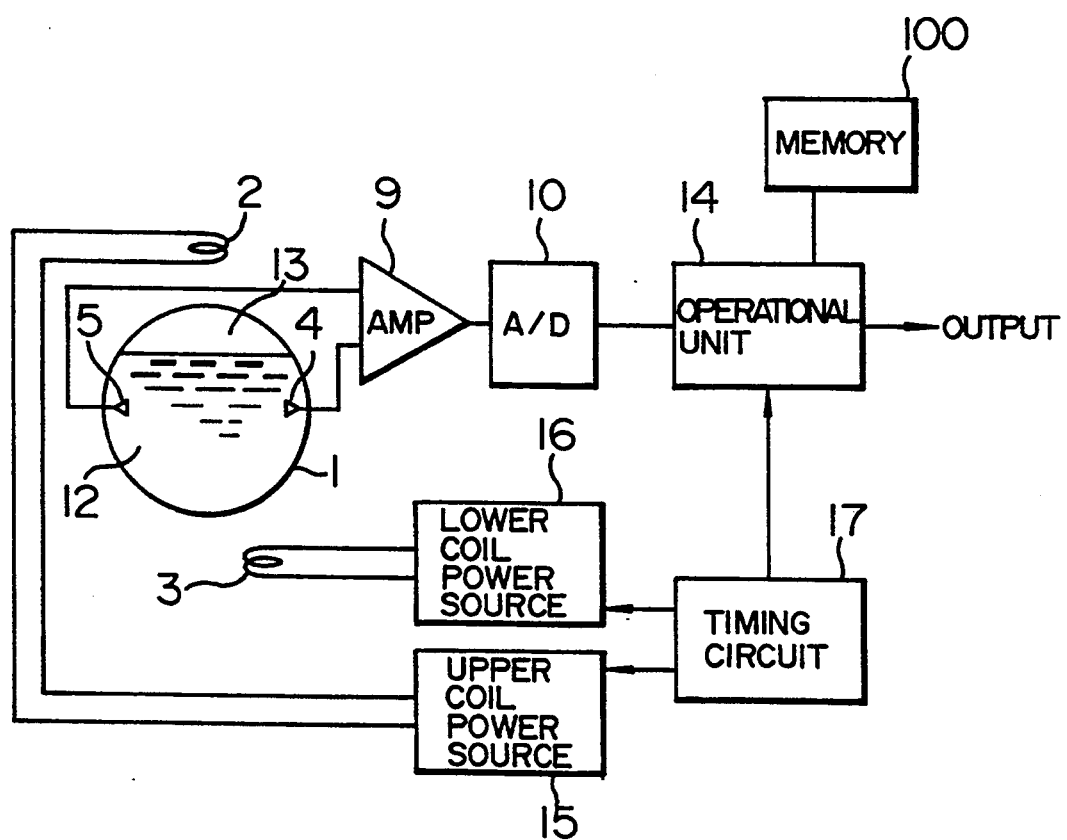
FIG. 5 is a block diagram of a first embodiment of the present invention.

Data on the relationship between the flow and the output from the opposing electrodes 4 and 5 obtained when the upper and lower coils 2 and 3 are excited is stored in a memory 100 of the apparatus shown in FIG. 5. In the measurement of the flow, the operational unit 14 estimates the flow from the output from the opposing electrodes 4 and 5 on the basis of the data on the relationship stored in the memory 100. The data on the estimated flow is output through a display, a printer and other utilizations devices (not shown). The flow measurement can be performed continuously by continuous excitation of the upper and lower coils 2 and 3.

When non-full state detection, to be described below, is performed, excitation of one of the upper and lower coils is stopped at appropriate intervals of time.

In order to detect the non-full state in the first embodiment of FIG. 5, the following ratio is calculated:

$$V_U/V_{UL} \tag{1}$$

where $V_U$ is a sensor output obtained when the excitation of the lower coil 3 is temporarily stopped and $V_{UL}$ is a sensor output obtained when both coils 2, 3 are excited.

From the principle of superposition in electromagnetics, the following relationship holds:

$$V_{LU} = V_U + V_L \tag{2}$$

where $V_U$ is an output obtained when only the upper coil 2 is excited and $V_L$ is an output obtained when only the lower coil 3 is excited.

Modifying expression (1), using expression (2), $$V_U/V_{UL} = V_U/(V_U+V_L) = (1+V_L/V_U)^{-1} \tag{3}$$

In the above description of the prior art, $$V_U/V_L < 1$$

in a non-full state. Thus, the relationship $V_L/V_U > 1$ holds, from which the expression (3) is modified as follows:

$$V_U/V_{UL} < \tfrac{1}{2}$$

Figure 4:
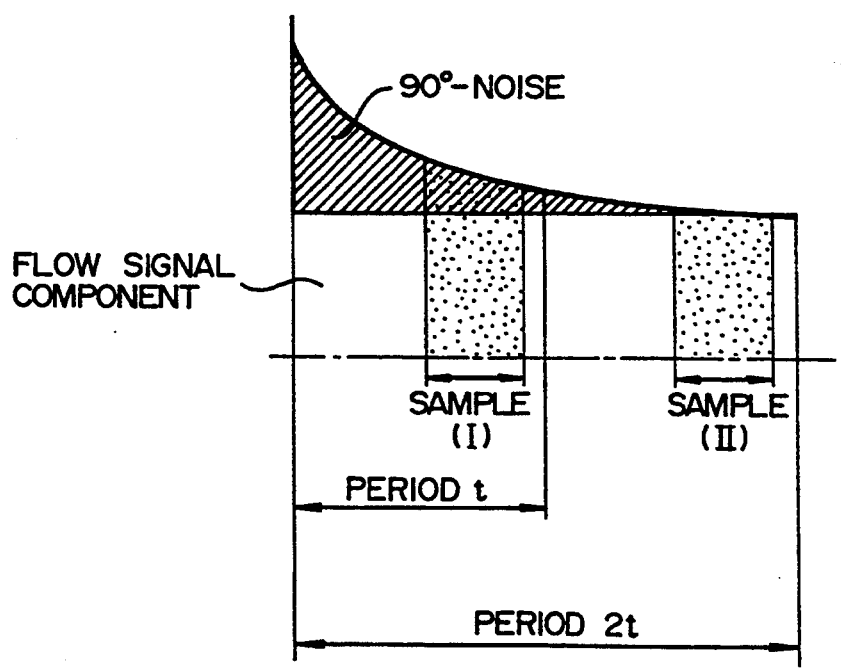
FIG. 4 illustrates the stability of a zero point.
Figure 8:
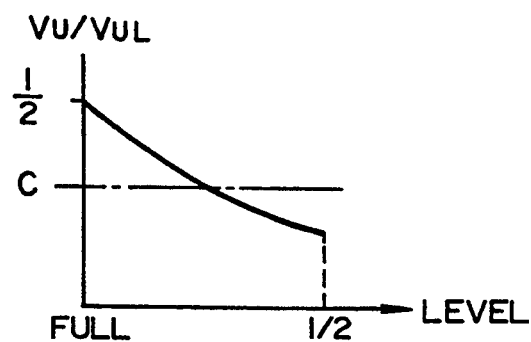
FIG. 8 is a diagram indicative of a change in the output ratio of the embodiment of the present invention.

The ratio $V_U/V_{UL}$ is $\tfrac{1}{2}$ in a full state, as shown in FIG. 4 and decreases as the level of the fluid lowers. Thus, when this ratio is lower than a given value C in FIG. 8, the operation control unit 11 can determine that the conduit is in a non-full state and output an appropriate alarm signal.

Figure 9:
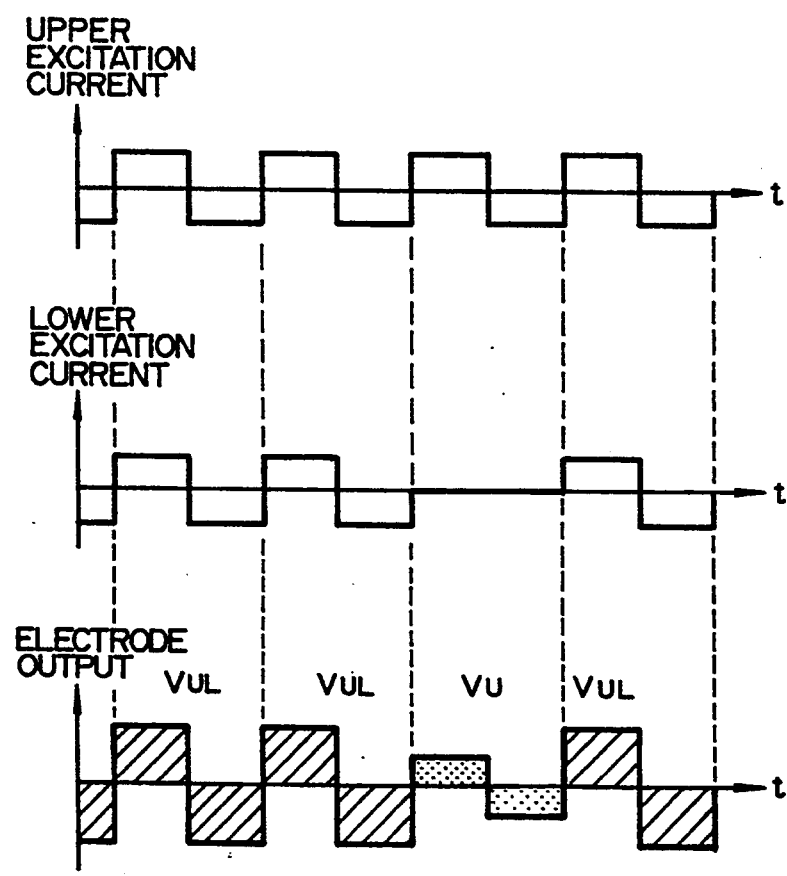
FIG. 9 shows an excitation waveform and an output waveform of the embodiment of the present invention.

FIG. 9 shows an upper and a lower exciting current and an electrode output waveform in such electromagnetic flowmeter.

When the excitation of the upper coil is stopped in order to detect a non-full state, the ratio $V_L/V_{UL}$ is monitored:

$$V_L/V_{UL} = V_L/(V_U+V_L) = (1+V_U/V_L)^{-1} \tag{4}$$

As described in the prior art, $V_U/V_L = 1$ in a full state while $V_U/V_L < 1$ in a non-full state, and the ratio $V_U/V_L$ decreases as the level of the fluid lowers.

Thus, the ratio of expression (4) is $\tfrac{1}{2}$ in a full state and gradually increases as the level of the fluid lowers in a non-full state. Accordingly, it can be determined that the conduit is in a non-full state when the ratio of the expression (4) is more than a pre-determined value.

The measurement of the flow using an output obtained when both, the upper and lower coils are excited serves to reduce a measurement error due to asymmetrical flow and/or a change in the conductivity of the fluid and improves responsiveness and the stability of the zero point.

The inventive electromagnetic flowmeter is constructed as described above, so that only the excitation of one excitation coil is required to be stopped temporarily in order to detect a non-full state of the conduit while both the upper and lower coils are normally excited. Thus, an adverse influence on an error involved in the measurement of the flow, and an error due to an asymmetrical flow and a change in the conductivity of the fluid are reduced. The responsiveness and stability of a zero point of the electromagnetic flowmeter are improved.

Japanese Patent Application Hei 4-45873 is incorporated herein by reference.

While the present invention has been described in detail, it should be understood that various changes, substitutions and alternations can be made hereto without departing from the spirit and scope of the present invention as defined by the appended claims.

What is claimed is:

1. An apparatus for determining whether or not a conduit is full of a fluid flowing therethrough, comprising:

an upper excitation coil disposed above the conduit;
    a lower excitation coil disposed below the conduit;
    a sensor disposed on the side of the conduit for producing an output corresponding to the fluid flow when each of said coils is excited;
    means for exciting both said upper and lower coils;
    means for exciting any one of said upper and lower coils;
    means for comparing a first output from said sensor produced when both said coils are excited and a second output from said sensor produced when any one of said coils is excited; and
    means for determining from the result of the comparison whether the conduit is full of the fluid flowing therethrough.

2. An apparatus according to claim 1, wherein said comparing means calculates a ratio of the first output to the second output.

3. An apparatus according to claim 2, wherein said determining means comparing the ratio of the first output to the second output with a predetermined threshold and determine is on the basis of the result of the comparison whether or not the conduit is full of the fluid.

4. An apparatus according to claim 3, wherein the second output comprises the output of said sensor obtained when said upper coil is excited.

5. An apparatus according to claim 4, wherein said determines means determining that the conduit is not full of the fluid when the ratio being less than the threshold.

6. An apparatus according to claim 3, wherein the second output comprises a sensor output obtained when said lower coil is excited.

7. An apparatus according to claim 6, wherein said determines means determining that the conduit is not full of the fluid when the ratio is more than the threshold.

8. A method of detecting whether or not a test conduit is full of a fluid flowing therethrough, comprising the steps of:

comparing a first output from sensors disposed on the side of the conduit when an upper excitation coil disposed above the conduit and a lower excitation coil disposed below the conduit are excited, and a second output from said sensors obtained when any one of said upper and lower coils is excited; and
    determining from the result of the comparison whether the conduit is full of the flow flowing therethrough.

* * * * *